(12) United States Patent
Yamanishi

(10) Patent No.: US 7,084,926 B2
(45) Date of Patent: Aug. 1, 2006

(54) RECEIVER FOR DIGITAL BROADCASTING

(75) Inventor: Yoshihiro Yamanishi, Osaka (JP)

(73) Assignee: Funai Electric Co., Ltd., Daito (JP)

( * ) Notice: Subject to any disclaimer, the term of this patent is extended or adjusted under 35 U.S.C. 154(b) by 285 days.

(21) Appl. No.: 09/912,441

(22) Filed: Jul. 24, 2001

(65) Prior Publication Data

US 2002/0067775 A1   Jun. 6, 2002

(30) Foreign Application Priority Data

Jul. 24, 2000   (JP) .............................. 2000-005232

(51) Int. Cl.
*H04N 5/445* (2006.01)
*H04N 5/50* (2006.01)

(52) U.S. Cl. ...................... 348/569; 348/563; 348/564; 348/731; 725/38; 725/56; 725/40

(58) Field of Classification Search ................ 348/569, 348/570, 558, 563, 567, 731, 732, 729; 725/38, 725/56, 44; 455/179.1, 180.1, 188.1
See application file for complete search history.

(56) References Cited

U.S. PATENT DOCUMENTS

| | | | | |
|---|---|---|---|---|
| 6,137,539 A | * | 10/2000 | Lownes et al. | 348/569 |
| 6,249,320 B1 | * | 6/2001 | Schneidewend et al. | 348/569 |
| 6,313,886 B1 | * | 11/2001 | Sugiyama | 348/731 |
| 6,337,715 B1 | * | 1/2002 | Inagaki et al. | 348/553 |
| 6,481,011 B1 | * | 11/2002 | Lemmons | 725/47 |
| 6,490,728 B1 | * | 12/2002 | Kitazato et al. | 725/151 |
| 6,621,528 B1 | * | 9/2003 | Kessler et al. | 348/734 |

FOREIGN PATENT DOCUMENTS

| | | |
|---|---|---|
| JP | 61-257084 | 11/1986 |
| JP | 10-191194 | 7/1998 |
| JP | 11-8807 | 1/1999 |

* cited by examiner

*Primary Examiner*—David Ometz
*Assistant Examiner*—Jean W. Désir
(74) *Attorney, Agent, or Firm*—Osha Liang LLP

(57) ABSTRACT

Other receivable subchannels S in addition to a major channel M and a subchannel S in selection now are displayed. Further, the subchannel S in selection now is differentiated (for example, changed in color) from the other receivable subchannels S to be displayed.

6 Claims, 4 Drawing Sheets

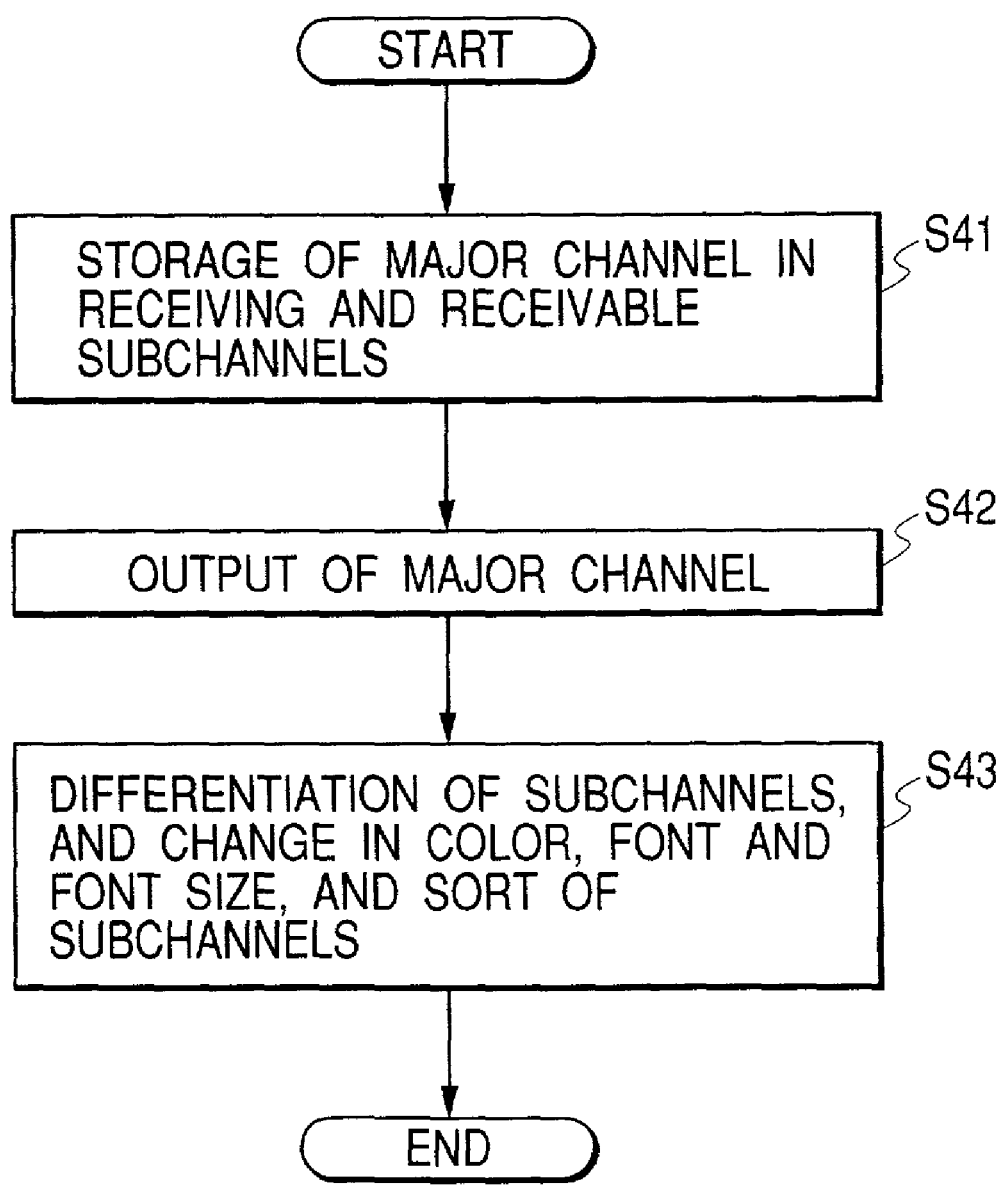

RECEIVER FOR DIGITAL BROADCASTING

BACKGROUND OF THE INVENTION

1. Technical Field

The present invention relates to a receiver for digital broadcasting capable of receiving digital multiplex broadcasting, and particularly to a receiver for digital broadcasting capable of easily determining a subchannel in broadcasting now and a subchannel in selection now when a plurality of subchannel information is sent by digital multiplex broadcasting.

2. Related Art

In recent years, digital multiplex broadcasting with several tens of channels (for example, 60 channels) using a communication satellite has been performed. For example, in ATSC (Advanced Television System Committee) broadcasting, major channels provided every broadcasting station and subchannels assigned to programs in which multiplex broadcasting is performed among the major channels are prepared, and a user selects a favorite program from these many channels and views the program.

Since the number of these channels is large, for example, as disclosed in JP-A-11-8807, a technique in which all the channel numbers in broadcasting now, program guidance and video in broadcasting stored temporarily are listed on one screen (plural screens in some case) and a selection of the program is facilitated has been known.

However, the receiver for digital broadcasting disclosed in JP-A-11-8807, when a user views television, there was the need to take the trouble to display a list screen and it was troublesome. Also, in digital multiplex broadcasting, there might be a subchannel which is not broadcast depending on a time zone, and there was a problem that it is difficult for a user to determine whether or not any channels can be viewed now. Due to such circumstances, development of a receiver for digital broadcasting capable of selecting a subchannel as simply or easily as possible during television viewing has been desired.

[Problems to be Solved]

The invention is implemented in view of such circumstances, and an object of the invention is to provide a receiver for digital broadcasting capable of easily determining a subchannel in broadcasting now and a subchannel in selection now when a plurality of subchannel information is sent by digital multiplex broadcasting.

[Means for Solving the Problems]

A receiver for digital broadcasting according to a first invention is characterized by a receiver for digital broadcasting capable of displaying a major channel provided every broadcasting station for distributing programs and a subchannel in selection among subchannels provided every program distributed by the broadcasting station according to the major channel, comprising storage section for storing the major channel and plural receivable subchannels broadcast by the broadcasting station according to the major channel, major channel output section for outputting the major channel stored by the storage section, differentiation section for differentiating between the subchannel in selection and the subchannels stored in the storage section other than the subchannel in selection, and subchannel output section for outputting the subchannel in selection differentiated by the differentiation section and the subchannels other than the subchannel in selection.

A receiver for digital broadcasting according to a second invention is characterized in that the differentiation section is constructed so that the subchannel in selection and the subchannels other than the subchannel in selection are set to different colors.

A receiver for digital broadcasting according to a third invention is characterized in that the differentiation section is constructed so that the subchannel in selection and the subchannels other than the subchannel in selection are set to different fonts.

A receiver for digital broadcasting according to a fourth invention is characterized in that the differentiation section is constructed so that a font size of the subchannel in selection and a font size of the subchannels other than the subchannel in selection are changed.

A receiver for digital broadcasting according to a fifth invention is characterized in that the differentiation section is constructed so that the subchannels stored in the storage section are sorted according to a predetermined condition.

In the first invention, the major channel provided every plural broadcasting stations for distributing programs and a group of the subchannels receivable now among plural subchannels broadcast by the broadcasting station are listed and displayed. Then, display of the subchannel which a user is selecting now, namely a user is viewing now is differentiated from a group of the other receivable subchannels. Then, the subchannel differentiated thus is outputted so as to display the subchannel on an image receiving unit. Since it is constructed so that the subchannels receivable now are displayed along with the major channel showing the broadcasting station thus, the user can easily recognize the subchannels viewable now. Also, since it is constructed so that the subchannel which the user is selecting (viewing) now is differentiated from the other receivable subchannels and is displayed, the user can easily recognize the subchannel which the user is selecting now.

In the second to fourth invention, since it is constructed so that a subchannel which a user is selecting now is colored to be displayed and the other receivable subchannels are colored with a color different from that of the subchannel, the user can more easily recognize the subchannel which the user is viewing now. In addition to this, since it is constructed so that a font or a font size of the subchannel which the user is selecting is differentiated from a font or a font size of the other receivable subchannels, the user can more easily recognize the subchannel which the user is viewing now.

In the fifth invention, for example, it is constructed so that a subchannel in viewing now is displayed on a particular portion (for example, top portion, center or bottom portion) of a screen and the other subchannels are sorted in numeric order of the subchannels to be sequentially displayed on a portion other than the particular portion. Since it is constructed so that the subchannels are sorted, namely permuted about the subchannel in selection now to be displayed thus, a user can easily recognize the subchannel in viewing now and also can easily have access to the other subchannels to desire viewing.

BRIEF DESCRIPTION OF THE DRAWINGS

FIG. 1 is a block diagram showing a hardware configuration of a receiver for digital broadcasting according to the invention;

FIG. 2 is a schematic diagram showing a channel display method on an image receiving part;

FIG. 3 is a schematic diagram showing a channel display method on the image receiving part; and

[FIG. 4]

FIG. 4 is a flowchart showing a processing procedure of channel display.

DETAILED DESCRIPTION OF THE
PREFERRED EMBODIMENTS

[Mode for Carrying out the Invention]

The invention will be described in detail below based on drawings showing the embodiment.

Figure 1:
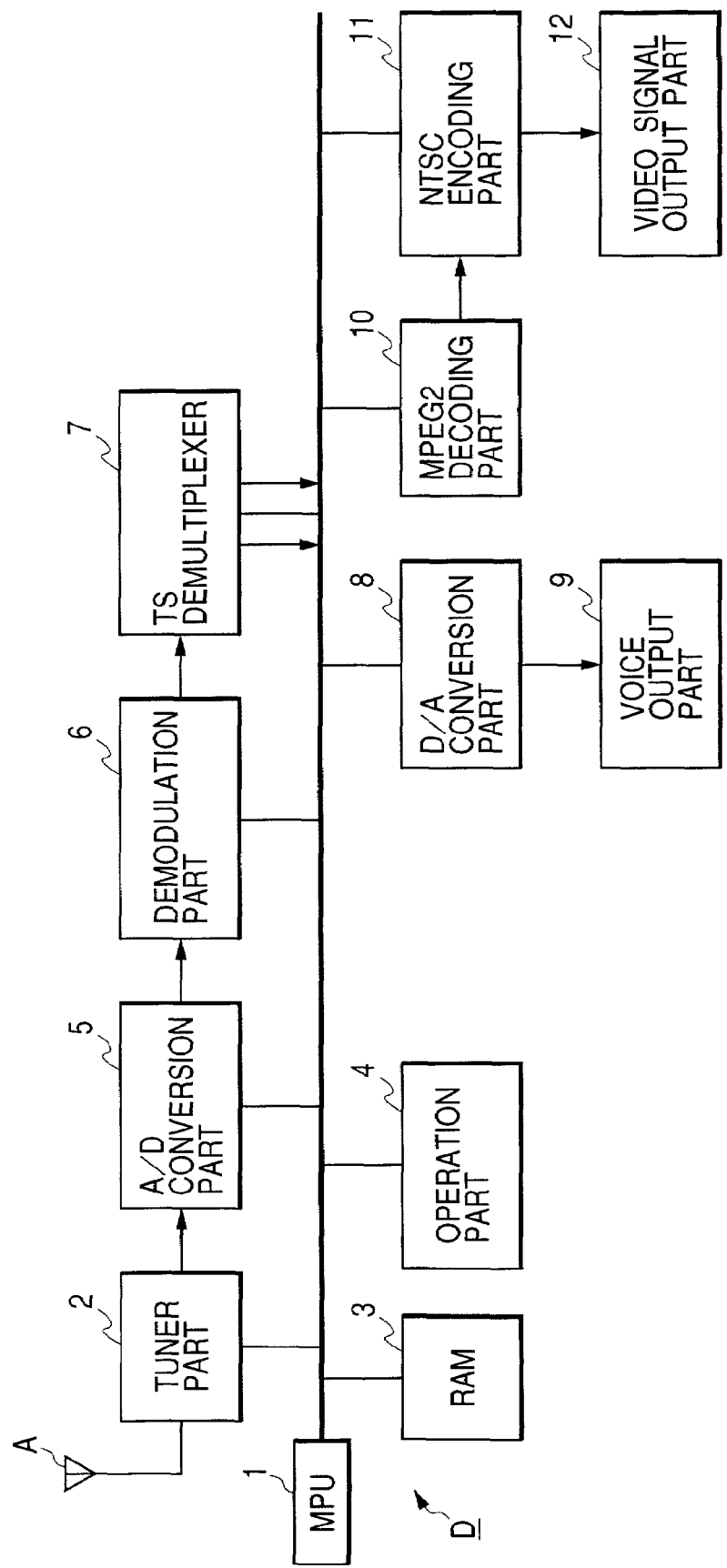
[FIG. 1]

FIG. 1 is a block diagram showing a hardware configuration of a receiver D for digital broadcasting according to the invention. In FIG. 1, numeral 4 is an operation part for performing various operations such as on-off operations of a power source or a channel selection, and outputs a signal according to the operations to an MPU 1. Satellite waves sent from a satellite are received by an antenna part A, and a tuner part 2 switches a received transponder by a channel selection operation of the operation part 4. The satellite waves are digitized by an A/D conversion part 5 and data is demodulated by a demodulation part 6.

A digital signal is sent by a TS (transport Stream) packet. The packet includes data such as video data, voice data, channel data and language (for example, English or Spanish), and each of these data is separated and outputted by a TS demultiplexer 7 and is stored in RAM 3. After converting voice data into an analog form by a D/A conversion part 8, the voice data is outputted to a voice output part 9 such as a speaker.

Figure 2:
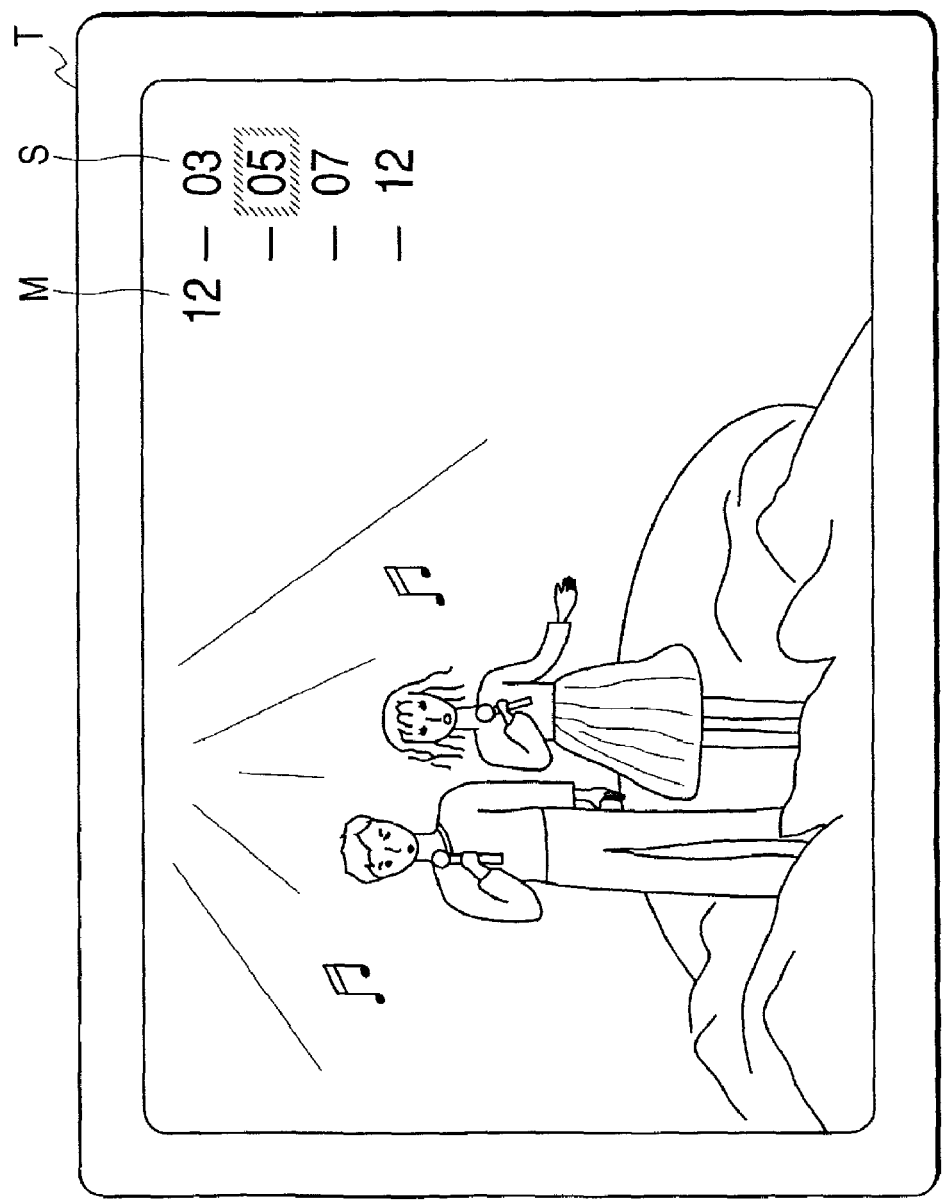
[FIG. 2]

On the other hand, video data is compounded into the video data before compression by an MPEG (Motion Picture Experts Group)-2 decoding part 10 and then, is compounded into an NTSC composite television signal by an NTSC encoding part 11 and is outputted to a video signal output part 12 and is outputted to an image receiving part T (see FIG. 2). Also, one transponder tuned by the tuner part 2 has a plural number of channels, so that these channel data is outputted from the TS demultiplexer 7 to the RAM 3 and is stored. The RAM 3 is graphics memory, and channel information stored is outputted to the video signal output part 12 by directions of the MPU 1 and is displayed on the image receiving part T.

Figure 3:
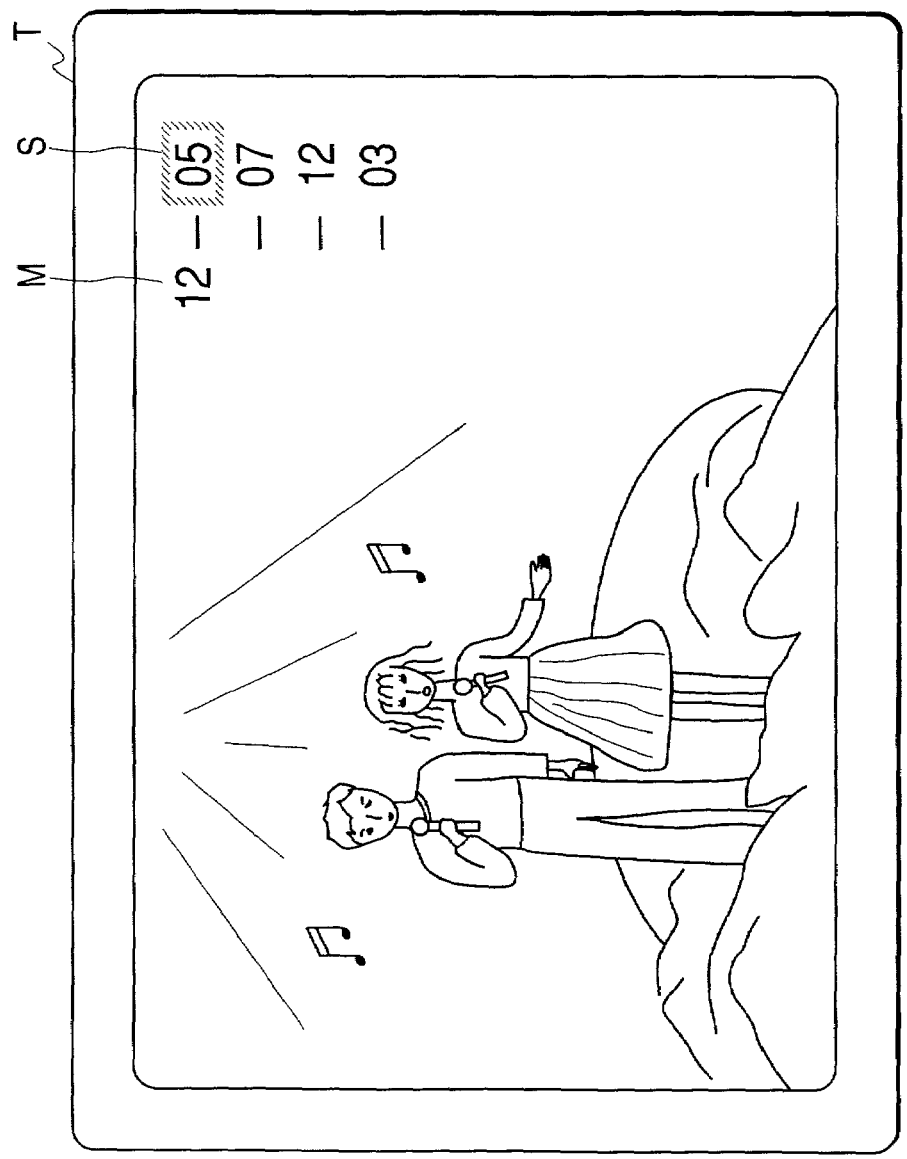
[FIG. 3]

FIGS. 2 and 3 are schematic diagrams showing a channel display method on the image receiving part T. In FIG. 2, a major channel M provided to a broadcasting station and subchannels S assigned to programs in which multiplex broadcasting is performed among the major channel M are displayed on the image receiving part T. The MPU 1 displays the subchannels S which are in broadcasting now and can be received on the basis of the channel information stored in the RAM 3. As shown in FIG. 2, a "12" channel is displayed as the major channel M, and "03", "05", "07" and "12" channels are displayed on the subchannels S, respectively. Then, with the subchannel S of "05" in viewing now, the MPU 1 directs to differentiate between the subchannel S of "05" and the other receivable subchannels S ("03", "07" and "12") to produce an output.

As a method of the differentiation, it is considered that the MPU 1 colors only the subchannel S in viewing now as shown in FIG. 2 or the MPU 1 sorts the subchannels S in numeric order ("03"→"05"→"07"→"12") and further permutes them so as to display the subchannel S of "05" in viewing now on the top portion ("05"→"07"→"12"→"03") as shown in FIG. 3. In addition, a font of the subchannel S in viewing now may be set to a Gothic typeface and a font of the other subchannels S may be set to a Mincho typeface. Also, a font size may be changed.

FIG. 4 is a flowchart showing a processing procedure of channel display. First, the MPU 1 stores a major channel M showing a broadcasting station in receiving and receivable subchannels S in broadcasting now into the RAM 3 (step S41) The stored major channel M is outputted to the video signal output part 12 (step S42) by a graphics memory function of the PAM 3 and is displayed on the image receiving part T. Then, the MPU 1 performs processing of differentiating between the subchannel S in selection now (in viewing by a user) and the other subchannels S (step S43). The MPU 1 first sorts the subchannels S stored into the RAM 3 in numeric order and further permutes them so that the subchannel S in selection now is positioned on the top portion or the bottom portion. Then, the subchannels S after the permutation are displayed on the image receiving part T. Further, the MPU 1 colors only the subchannel S in selection and displays it. In addition, the MPU 1 specifies a font or a font size of the subchannel S in selection. Then, in the other subchannels S, a font other than the already specified font is specified and also a font size smaller than the font size of the subchannel S in selection is specified to the other subchannels S (step S43).

[Effect of the Invention]

As described in detail above, in the first invention, the major channel provided every plural broadcasting stations for distributing programs and a group of the subchannels receivable now among plural subchannels broadcast by the broadcasting station are listed and displayed. Then, display of the subchannel which a user is selecting now, namely a user is viewing now is differentiated from a group of the other receivable subchannels. Then, the subchannel differentiated thus is outputted so as to display the subchannel on an image receiving unit. Since it is constructed so that the subchannels receivable now are displayed along with the major channel showing the broadcasting station thus, the user can easily recognize the subchannels viewable now. Also, since it is constructed so that the subchannel which the user is selecting (viewing) now is differentiated from the other receivable subchannels and is displayed, the user can easily recognize the subchannel which the user is selecting now.

In the second to fourth invention, since it is constructed so that a subchannel which a user is selecting now is colored to be displayed and the other receivable subchannels are colored with a color different from that of the subchannel, the user can more easily recognize the subchannel which the user is viewing now. In addition to this, since it is constructed so that a font or a font size of the subchannel which the user is selecting is differentiated from a font or a font size of the other receivable subchannels, the user can more easily recognize the subchannel which the user is viewing now.

In the fifth invention, for example, it is constructed so that a subchannel in viewing now is displayed on a particular portion (for example, top portion, center or bottom portion) of a screen and the other subchannels are sorted in numeric order of the subchannels to be sequentially displayed on a portion other than the particular portion. Since it is constructed so that the subchannels are sorted, namely permuted about the subchannel in selection now to be displayed thus, a user can easily recognize the subchannel in viewing now and also can easily have access to the other subchannels to desire viewing, and the invention can have the excellent effect.

What is claimed is:

1. A receiver for digital broadcasting configured to list a representation of a major channel provided by a broadcasting station for distributing programs and representations of a plurality of subchannels comprising a selected subchannel among the plurality of subchannels, each of the plurality of subchannels associated with a program for viewing that is broadcast by the broadcasting station according to the major channel, comprising:
 a storage section configured to store the major channel and the plurality of subchannels,
 a major channel output section configured to list the representation of the major channel stored by said storage section,
 a differentiation section configured to differentiate the selected subchannel from the plurality of subchannels stored in the storage section other than the selected subchannel, and
 a subchannel output section configured to list a representation of the selected subchannel and representations of the plurality of subchannels other than the selected subchannel,
 wherein the representation of the major channel, the representation of the selected subchannel, and the representations of the plurality of subchannels other than the selected subchannel are simultaneously displayed on an image receiving part, on which a user is simultaneously viewing a particular program that is broadcast on the selected subchannel, and
 wherein the representation of the selected subchannel is formatted differently than the representations of the plurality of subchannels other than the selected subchannel.

2. The receiver for digital broadcasting of claim 1, wherein said differentiation section is constructed so that the representation of the selected subchannel and the representations of the plurality of subchannels other than the selected subchannel are set to different colors.

3. The receiver for digital broadcasting of claim 1, wherein said differentiation section is constructed so that the representation of the selected subchannel and the representations of the plurality of subchannels other than the selected subchannel are set to different fonts.

4. The receiver for digital broadcasting of claim 1, wherein said differentiation section is constructed so that a font size of the representation of the selected subchannel and a font size of the representations of the plurality of subchannels other than the selected subchannel are changed.

5. The receiver for digital broadcasting of claim 1, wherein said differentiation section is constructed so that the plurality of subchannels stored in said storage section are sorted according to a predetermined condition.

6. The receiver for digital broadcasting of claim 5, wherein the alphanumeric representation of the selected subchannel is displayed on a particular portion of the image receiving part and the alphanumeric representations of the other subchannels are displayed on a portion other than the particular portion.

* * * * *